United States Patent [19]

Wang et al.

[11] 4,077,905
[45] Mar. 7, 1978

[54] NOVEL CATALYST SYSTEM

[75] Inventors: Long Shyong Wang, Stamford; Erwin Richard Ruckel, Darien, both of Conn.

[73] Assignee: Arizona Chemical Company, Wayne, N.J.

[21] Appl. No.: 731,271

[22] Filed: Oct. 12, 1976

Related U.S. Application Data

[63] Continuation of Ser. No. 576,936, May 12, 1975, Pat. No. 4,011,385.

[51] Int. Cl.$^2$ ............................................... C08F 4/72
[52] U.S. Cl. ............................... 252/429 A; 252/429 C
[58] Field of Search ....................... 252/429 A, 429 C

[56] References Cited

U.S. PATENT DOCUMENTS

| | | | |
|---|---|---|---|
| 3,210,334 | 10/1965 | Carrick | 252/429 C X |
| 3,278,508 | 10/1966 | Kahle et al. | 252/431 L X |
| 3,378,539 | 4/1968 | Nowlin et al. | 252/429 A X |
| 3,502,630 | 3/1970 | Borsini et al. | 252/429 A X |

*Primary Examiner*—Patrick P. Garvin
*Attorney, Agent, or Firm*—Harry H. Kline

[57] ABSTRACT

There is provided a novel catalyst system and a process for polymerizing olefins by adding the same incrementally to said catalyst system consisting essentially of an aluminum halide and an organo germanium halide or alkoxide in an inert solvent while controlling the temperature of reaction in the range of $-30°$ C to $+30°$ C, drowning the polymerization mixture in water, separating the organic phase therefrom, removing the solvent therefrom, and recovering a solid polymer in good yield.

8 Claims, No Drawings

NOVEL CATALYST SYSTEM

This application is a continuation of our copending application, Ser. No. 576,936, filed May 12, 1975, now U.S. Pat. No. 4,011,385, issued on Mar. 8, 1977.

The present invention relates to a method for polymerizing olefins. More specifically, the present invention relates to a method for polymerizing difficultly polymerizable olefins or mixtures thereof to obtain polymers in good yields. Still more particularly, it is concerned with a method for polymerizing olefins, such as isoprene, isobutylene, terpenes or mixtures of same, utilizing a catalyst system comprising an aluminum halide and an alkyl germanium or an aryl germanium halide or alkoxide to obtain polymers having softening points of at least 110° C and possessing relatively high molecular weights.

As is known, α-pinene has been subjected to isomerization and polymerization utilizing catalyst systems, such as aluminum chloride alone or in conjunction with either a trialkyl silicon halide or a dialkyl tin dichloride, attention being directed to U.S. Pat. Nos. 3,354,132 and 3,478,007. However, none of the prior methods is entirely satisfactory. This is because the yields obtained are poor and softening points low. Moreover, even to obtain such unsatisfactory yields, such prior procedures require rigorous drying of the monomer and other components of the mixture prior to polymerization. If a process could be provided to insure high yields hitherto unobtainable, and without scrupuously and carefully drying the monomers present, such a process would fulfill a need long recognized in the art.

It is, therefore, a principal object of the invention to provide a straightforward process for polymerizing olefins. It is a further object to polymerize olefins utilizing a catalyst system comprising an aluminum halide and an alkyl or an aryl germanium halide or alkoxide to obtain polymers in yields hitherto unavailable. It is a still further object to obtain olefinic polymers from monomers which have not been rigorously fractionated or dried to remove water therefrom. Other objects and advantages will become apparent from a reading of the ensuing description.

To this end, it has been found that difficultly polymerizable olefins can be polymerized in a straightforward manner to obtain corresponding polymers in good yields. Unexpectedly, a catalyst system comprising aluminum halide and either an alkyl or an aryl germanium halide or alkoxide utilized during polymerization of undried olefins causes the polymerization of the reaction mixture to proceed to an extent hitherto unknown.

Thus, according to the process of the invention, difficultly polymerizable olefins are subjected to polymerization in the presence of a catalyst system consisting of: (1) a (lower) alkyl germanium halide or an aryl germanium halide or its corresponding alkoxide and (2) aluminum chloride, aluminum bromide or mixtures thereof.

There is first prepared a slurry of the aforementioned catalyst system in an inert solvent and the undried or dried olefin is then added incrementally with vigorous stirring while maintaining the reaction mixture at from about minus (−) 30° C to about plus (+) 30° C and, preferably, between about −20° C to +20° C, to insure maximum yield of resin of high softening point. After the olefin has been added, stirring and cooling are continued for at least fifteen minutes or until the amount of unreacted monomer is substantially reduced. Thereafter, the mixture is permitted to rise slowly to a temperature of about 20° C over a period of one to four hours. The reaction mixture is quenched with water or dilute hydrochloric acid with the production of an organic phase and an aqueous phase. Resultant polymer is then recovered as a residue after removal of the organic solvent, as by steam distillation.

Illustrative of the olefins which can be employed herein are: linear aliphatic mono or di-olefins, such as isobutylene, isoprene, or piperylene, and terpenic olefins, such as α-pinene, β-pinene, camphene, dipentene, limonene, and mixtures of the same, such as α-pinene and isoprene or α-pinene and limonene, so as to obtain either homopolymers or copolymers.

Exemplary solvents or diluents include: aromatic hydrocarbons such as, toluene, mixed xylenes, mesitylene, diethyl benzenes, and Solvesso 100 (98% aromatics, 0.876 sp. gr., b. p. 155° C–175° C). Other solvents that can be employed herein are halogenated hydrocarbons, both aliphatic and aromatic, such as methylene chloride, ethyl chloride or chlorobenzene.

Advantageously, the ratio of the organo germanium halide to aluminum chloride or bromide in the catalyst system may vary within wide limits. Preferable, a range of from 0.1 to 1.5 weight percent, based on the olefin monomer, and, preferably, from 0.2 to 0.8 weight percent, of the organo germanium halide or alkoxide and from 2 to 10 weight percent, based on the olefin monomer, and preferably, from 2 to 5 weight percent of aluminum chloride or bromide is utilized. It has been found that particularly satisfactory results are attained with catalyst systems comprising 3 to 5 weight percent of aluminum chloride and 0.6 weight percent of a trialkyl germanium halide or a triaryl germanium halide.

The organo germanium halide or alkoxide utilized in the process of this invention can be presented by the formula:

$$R_nGeX_y$$

where R is lower alkyl or aryl, X is halogen or lower alkoxide, $y$ is an integer from 1 to 3 and $n$ is $4-y$.

Illustrative of the organo germanium halide or alkoxide co-catalyst component employed are:

trimethyl germanium chloride,
trimethyl germanium methoxide,
triethyl germanium chloride,
triethyl germanium ethoxide,
tri-n-propyl germanium chloride,
tri-n-propyl germanium bromide,
tri-isopropyl germanium chloride,
tri-n-butyl germanium iodide,
tri-t-butyl germanium chloride,
dimethyl germanium dichloride,
dimethyl germanium dimethoxide,
diethyl germanium dichloride,
diethyl germanium dibromide,
diethyl germanium diiodide,
di-n-propyl germanium dichloride,
di-isopropyl germanium dibromide,
di-n-butyl germanium dichloride,
monoethyl germanium trichloride,
monoethyl germanium triethoxide,
monopropyl germanium trichloride,
monopropyl germanium trifluoride,
diphenyl germanium dichloride,
diphenyl germanium dibromide,
triphenyl germanium bromide, triphenyl germanium iodide,
mononaphthyl germanium trichloride,
mononaphthyl germanium triiodide,
trinaphthyl germanium chloride,
trinaphthyl germanium bromide,
trinaphthyl germanium methoxide,
trinaphthyl germanium iodide,
trinaphthyl germanium fluoride, and equivalents of the same.

Advantageously, in the production of the high yields of high softening point resin which characterize the present invention, both the terpenic olefin reactant and the inert solvent can be utilized without the removal of water therefrom. For instance, it is known that a solvent can contain as much as 400 ppm water and the monomer can similarly contain as much as 200 ppm water under ambient conditions. Greater amounts of water, however, can not be tolerated without concomitant reductions in yields of polymer. Alternatively, if desired, the solvent and monomer can be dried prior to reaction by azeotropic removal of water or by their passage through a drying agent.

In a preferred practice of the invention, monomeric olefin such as for instance, alpha-pinene, and solvent are each employed undried i.e., with from about 100 to about 300 ppm of detectable water. The overall system is next flushed with an inert gas, suitably nitrogen. The solvent and catalyst system are introduced into the vessel and the monomeric olefin is then added incrementally and progressively, for instance, in dropwise fashion, while vigorously stirring the reaction medium. As soon as the monomeric olefin addition begins, an exotherm occurs and cooling is applied to maintain the reaction medium at minus 15° C to minus 20° C. Stirring and temperature control at this level are continued for a period of time, generally 30 minutes, after all of the olefin had been added. Some fifteen minutes to four hours suffices for the latter purpose. Thereafter, the temperature is, allowed to gradually rise over a period of from one to two hours to 20° C to 25° C, where it is maintained for from two to four hours. Normally, reaction is continued until essentially all monomer is converted.

At the end of this time, the reaction medium is quenched to inactivate the catalyst, as by adding a volume of water equal to the volume of alpha-pinene used. If desired, there may be used a dilute solution of an acid, such as hydrochloric acid, instead of water. In either case there are formed two layers, one of which constitutes a hydrocarbon phase and the other is an aqueous phase. These are separated and the hydrocarbon phase is washed repeatedly with equal amounts of water.

As hereinabove defined, a preferred monomeric reactant, alpha-pinene, can be of quite high purity. For instance, alpha-pinene of 95 percent purity is commercially available and will give excellent results.

In order to facilitate a further understanding of the invention, the following examples are presented primarily for purposes of illustrating certain more specific details thereof. The invention is not to be deemed limited thereby except as defined in the claims. Unless otherwise noted, the parts and percentages are by weight.

EXAMPLE 1

To a suitable three-neck flask are introduced 210 parts of xylene and there are next added 9 parts of aluminum chloride and 1.8 parts of triethyl germanium chloride $[(C_2H_5)_3GeCl]$, providing a weight percent ratio of 5:1. The resultant mixture is vigorously stirred. 300 Parts of alpha-pinene are then introduced over a period of 30 minutes. The reaction mixture is held at minus 15° C to minus 20° C by a cooling bath. Thereafter, the contents of the flask are maintained in an inert nitrogen atmosphere at this temperature for one-half hour. Thereafter, the temperature is allowed to rise gradually with controlled cooling while finally reaching +20° C to +25° C after 2½ hours. There is next added water equal in volume to the alpha-pinene used, to inactivate the catalyst system, and to cause separation of the aqueous and organic phases. Resultant phases are separated, and the organic phase is washed three times with equal amounts of water. It is then charged to a suitable flask provided with a heater, thermometer and nitrogen atmosphere, and the temperature raised to 210° C, thereby removing the solvent and recovering a substantial amount of the volatile germanium constituent in the distillate. The introduction of nitrogen is discontinued and in its place steam is passed in until the temperature reached 230° C to 240° C. Steaming is continued until the resin softening point reaches the desired limit. Application of vacuum removes any trace of moisture and the molten resin is obtained in 96.7% yield and having:

Softening point — 120° C, ring and ball
Color — Gardner 2
Dimer oil yield — trace

EXAMPLE 2

Repeating Example 1 in every detail except that trimethyl germanium chloride, trimethyl germanium bromide or triphenyl germanium chloride is substituted for triethyl germanium chloride, there is obtained α-pinene polymer in excellent yields.

EXAMPLE 3

The procedure of Example 1 is repeated in every detail except that trimethyl germanium bromide in lieu of triethyl germanium chloride is dissolved directly in the monomer feed rather than in the solvent. There results a yield of 95% α-pinene resin having a softening point of 113° C.

EXAMPLE 4

The procedure of Example 1 is followed in every detail except that the monomeric α-pinene reactant and the solvent are carefully dried. There is obtained a resin yield (polymer) of 91.0%, based on the weight of the monomer, and a softening point of 125° C.

Alpha-pinene polymers prepared as in Examples 1 to 4 have molecular weights of from about 700 to 900 (vapor pressure osometer), and a softening point of at least about 110° C. These polymers are soluble in solvents, such as hexane, benzene, heptane, toluene, xylene, and mineral spirits. However, the latter differ from other related polymers, namely, the beta-pinene polymers, in exhibiting solubility in methyl ethyl ketone, dioxane, ethyl acetate and cyclohexanol.

EXAMPLES 5–16

The procedure of Example 1 is followed in every respect except that the specific solvent, temperature, catalyst system and polymeric product are set forth and summarized in Table I below.

TABLE I

| Example | ((-PINENE (By Wt.) | SOLVENT Type | Amt. (By Wt.) | TEMPERATURE Initial (° C) | Final (° C) | CATALYST SYSTEM AlCl₃ (By Wt.) | R$_n$GeX$_y$ Type | Amt. (By Wt.) | PRODUCT Yield % | S.P. ° C |
|---|---|---|---|---|---|---|---|---|---|---|
| 5 | 300 | XYLENE | 210 | −20 | +20 | 9 | (C₂H₅)₃GeCl | 1.8 | 94.5 | 115 |
| 6 | " | " | " | " | " | 18 | " | " | 93.0 | 116 |
| 7 | " | TOLUENE | " | " | " | 9 | " | 1.2 | 89.0 | 115 |
| 8 | " | XYLENE | " | " | " | " | " | 0.7 | 88.0 | 113 |
| 9 | " | " | " | " | " | " | (CH₃)₃GeCl | 1.8 | 93.4 | 115 |
| 10 | " | TOLUENE | 400 | " | " | " | (CH₃)₃GeBr | 1.9 | 98.0 | 113 |
| 11 | " | " | 210 | " | " | " | NONE | — | 28.0 | 90 |
| 12 | " | XYLENE | 300 | " | " | " | (CH₃)₂GeCl₂ | 1.3 | 92.0 | 114 |
| 13 | " | " | 210 | +20 | " | " | (C₂H₅)₃GeCl | 1.8 | 87.5 | 111 |
| 14 | " | ETHYL BENZENE | " | +5 | " | 15 | " | 1.21 | 87.0 | 100 |
| 15 | " | XYLENE | " | 0 | 0 | 9 | " | 1.0 | 80.0 | 113 |
| 16 | " | XYLENE | " | −20 | +20 | 9 | (C₂H₅)₃GeOCH₃ | 1.8 | 89 | 114 |

EXAMPLES 17-26

The following examples all illustrate the AlCl₃/R$_n$GeX$_y$ catalyst system, where R, X, n and y are defined above, as useful for the preparation of homopolymers and copolymers derived from a variety of monomers by utilizing the procedure of Example 1. The modifications and results are summarized in Table II below.

TABLE II

| Example | Monomer Feed | Monomer (By Wt.) | AlCl₃ (By Wt.%) | R$_n$GeX$_y$ Type | Amt. (By Wt.) | Product Yield (%) | S.P. (° C) |
|---|---|---|---|---|---|---|---|
| 17 | CAMPHENE | 300 | 3 | (C₂H₅)₃GeCl | 1.8 | 60 | 76 |
| 18 | CAMPHENE DIPENTENE PHELIANDRENE TERPINOLENE | 300 162 42 51 | 3 | NONE | — | 5 | — |
| 19 | β-PINENE SULFUR OXYGENATED MONOTERPENE OTHERS | 24 1300 ppm 0.2% 21 | 3 | (C₂H₅)₃GeCl | 1.8 | 88 | 115 |
| 20 | " | " | 3 | NONE | — | 55 | 60 |
| 21 | α-PINENE LIMONENE | 150 150 | 3 | (CH₃)₃GeBr | 1.9 | 86 | 114 |
| 22 | α-PINENE/ ISOBUTYLENE | 240/ 135 | 2.4 | (C₂H₅)₃GeCl | 3.5 | 96 | 35 |
| 23 | α-PINENE/ ISOPRENE | 135/ 165 | 5 | (C₂H₅)₃GeCl | 1.5 | 96 | 85 |
| 24 | ISOPRENE | 152 | 5.9 | " | 1.5 | 20 | — |
| 25 | ISOBUTYLENE | 125 | 7.2 | " | 1.5 | 50 | M.W.= 30,000 |
| 26 | PIPERYLENE | 136 | 5.8 | " | 1.36 | 100 | 72 |

EXAMPLE 27

Alpha-pinene and alpha-pinene-limonene resins, as prepared in accordance with Examples 1 and 21, respectively, are extremely light in color and show exceptionally wide compatibility with commonly used polymers and film formers. They have the ability to tackify other materials with which they are compatible, such as styrene-butadiene rubber, natural rubber, ethylene-propylene elastomers chlorobutyl and butyl rubbers.

The following table lists results of test evaluations of pressure sensitive adhesives employing α-pinene resin and a 1:1 α-pinene-limonene copolymer as tackifier with pale crepe natural rubber and styrene-butadiene-styrene block copolymer, respectively.

TABLE III

| Tackifier | Shear Adhesion [1] (min.) | Tack[2] (in.) | 180° Peel Adhesion[3] (oz./in.) |
|---|---|---|---|
| α-pinene resin | 121 | 0.4 | 28 |
| α-pinene/limonene copolymer | 10,000+ | 0.9 | 31 |

[1]Test Method PSTC-2 modified, so adhesive-metal contact angle is 20° C
[2]Test Method PSTC-18
[3]Test Method PSTC-1

The tackifiers listed above are employed in the following formulation:
100 parts elastomer
75 parts tackifying resin
1 part antioxidant Polyisoprene natural rubber is milled to a Mooney viscosity of 50 prior to use. Kraton 1102 ®, a linear block styrene-butadiene-styrene, is used as received.

EXAMPLE 28

α-Pinene-isobutylene copolymer as prepared in accordance with Example 22, is a resin having a softening point of 35° C. In addition to its use in pressure sensitive tapes as shown in Example 27, the low molecular weight polymer has a large variety of applications, such as an oil additive, viscosity index improvers, sealant, caulking agent, waterproofing, soundproofing compounds, inks, leather impregnation, paper coating and as a special lubricant.

We claim:

1. A catalyst system adapted for use in polymerizing difficultly polymerizable olefins selected from the class consisting of isobutylene, isoprene, alpha-pinene, beta-pinene, camphene, dipentene, limonene, which system consists essentially of an alkyl germanium halide or an alkyl germanium alkoxide or an aryl germanium halide and aluminum chloride or aluminum bromide or mixtures of the latter, the ratio of the said alkyl or aryl germanium halide or alkoxide to aluminum chloride or aluminum bromide ranging from 0.1 to 1.5, weight percent, based on the olefin monomer employed, and from 2 to 10, weight percent, based on the olefin monomer employed, respectively.

2. The catalyst system according to claim 1 wherein the alkyl germanium halide is trimethyl germanium chloride.

3. The catalyst system according to claim 1 wherein the alkyl germanium halide is triethyl germanium chloride.

4. The catalyst system according to claim 1 wherein the alkyl germanium halide is tri-n-propyl germanium chloride.

5. The catalyst system according to claim 1 wherein the alkyl germanium halide is trimethyl germanium bromide.

6. The catalyst system according to claim 1 wherein the alkyl germanium alkoxide is trimethyl germanium methoxide.

7. The catalyst system according to claim 1 wherein the alkyl germanium halide is triphenyl germanium chloride.

8. The catalyst system according to claim 1 wherein aluminum chloride is employed.

* * * * *